(12) United States Patent
Wette

(10) Patent No.: US 10,949,682 B2
(45) Date of Patent: Mar. 16, 2021

(54) METHOD FOR ASCERTAINING A PIECE OF TOPOLOGICAL INFORMATION OF AN INTERSECTION

(71) Applicant: Robert Bosch GmbH, Stuttgart (DE)

(72) Inventor: Philip Wette, Bueckeburg (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 16/285,456

(22) Filed: Feb. 26, 2019

(65) Prior Publication Data

US 2019/0266417 A1   Aug. 29, 2019

(30) Foreign Application Priority Data

Feb. 28, 2018   (DE) ..................... 10 2018 202 970.9

(51) Int. Cl.
| | |
|---|---|
| *G01C 21/36* | (2006.01) |
| *G06N 3/08* | (2006.01) |
| *G08G 1/16* | (2006.01) |
| *G06K 9/00* | (2006.01) |
| *G01C 21/32* | (2006.01) |

(52) U.S. Cl.
CPC ......... *G06K 9/00798* (2013.01); *G01C 21/32* (2013.01); *G01C 21/3658* (2013.01); *G06N 3/08* (2013.01); *G08G 1/167* (2013.01)

(58) Field of Classification Search
CPC .... G01C 21/30; G01C 21/32; G01C 21/3661; G06K 9/00798; G06K 9/00791; G06K 9/00805; G06K 9/00818; G08G 1/20
USPC ............. 382/103–104, 100; 701/1–2, 23–27, 701/408–409, 411, 450–452, 532
See application file for complete search history.

(56) References Cited

U.S. PATENT DOCUMENTS

| | | | | |
|---|---|---|---|---|
| 2001/0021888 A1* | 9/2001 | Burns | ................... | G05D 1/0278 |
| | | | | 701/23 |
| 2011/0112760 A1* | 5/2011 | Serbanescu | .......... | G09B 29/106 |
| | | | | 701/465 |
| 2014/0358414 A1 | 12/2014 | Ibrahim et al. | | |
| 2015/0260530 A1* | 9/2015 | Stenborg | ................ | G01C 21/30 |
| | | | | 701/461 |
| 2016/0231750 A1* | 8/2016 | Kawamata | ............. | G06Q 10/08 |
| 2017/0236422 A1* | 8/2017 | Naka | ..................... | B60W 30/12 |
| | | | | 701/301 |
| 2019/0385458 A1* | 12/2019 | Garrett | .................... | G08G 1/166 |

FOREIGN PATENT DOCUMENTS

| | | |
|---|---|---|
| CN | 102 436 598 A | 5/2012 |
| DE | 102013205057 B3 | 8/2014 |
| DE | 102013227144 A1 | 12/2014 |
| DE | 102013107960 A1 | 1/2015 |
| EP | 2416302 A1 | 2/2012 |
| EP | 3128495 A1 | 2/2017 |
| EP | 3 171 292 A1 | 5/2017 |

* cited by examiner

*Primary Examiner* — Dwayne D Bost
*Assistant Examiner* — Stephen M Brinich
(74) *Attorney, Agent, or Firm* — Norton Rose Fulbright US LLP; Gerard Messina

(57) ABSTRACT

A method for ascertaining a piece of topological information of an intersection, including locating a vehicle with lane accuracy when negotiating the intersection; ascertaining data by the vehicle when negotiating the intersection; transmitting the data to a processing unit; and ascertaining a connectivity of lane-roadway combinations of the intersection from the data with the aid of the processing unit.

9 Claims, 3 Drawing Sheets

METHOD FOR ASCERTAINING A PIECE OF TOPOLOGICAL INFORMATION OF AN INTERSECTION

CROSS REFERENCE

The present application claims the benefit under 35 U.S.C. § 119 of German Patent Application No. DE 102018202970.9 filed on Feb. 28, 2018, which is expressly incorporated herein by reference in its entirety.

FIELD

The present invention relates to a method for ascertaining a piece of topological information of an intersection. The present invention furthermore relates to a device for ascertaining a piece of topological information of an intersection. The present invention furthermore relates to a computer program product.

BACKGROUND INFORMATION

In the related art, vehicles are able to locate their precise lanes, for example, with the aid of a camera, GPS, inertial sensor system, etc.

Furthermore, conventionally, high precision road maps may be generated by an aggregation of geometries detected by measuring vehicles (e.g., lane markings, road signs, etc.).

European Patent Application No. EP 3 171 292 A1 describes a method for processing map data, in particular traffic lane data. A neural network is used for this purpose, to be able to determine agreements between original images and instantaneous images and assign them to a traffic lane in order to create high precision maps in this way.

Chinese Application No. CN 102 436 598 A describes a method for ascertaining an optimal driving route based on pieces of camera and position information, which are processed with the aid of a neural network. An application of neural networks in traffic is described, in which driving routes are ascertained based on these networks.

SUMMARY

It is an object of the present invention to provide a piece of connectivity information for an intersection.

According to a first aspect of the present invention, the object may be achieved by an example method for generating pieces of topological information of a road map, including the steps:
  locating a vehicle with lane accuracy when negotiating the intersection;
  ascertaining data by the vehicle when negotiating the intersection;
  transmitting the data to a processing unit; and
  ascertaining a connectivity of lane-roadway combinations of the intersection from the data with the aid of the processing unit.

Advantageously, an ascertainment of a connectivity, i.e., an ascertainment of a linkage of an entrance lane to an exit lane of the intersection is carried out in this way. In this way, a piece of information is advantageously provided as to how a vehicle may be guided within an intersection. Ultimately, a piece of error-free topological information of an intersection is thus provided from a large number of data, which may potentially also be subject to errors. Advantageously, these data may be reused in a variety of ways, for example for manufacturers of digital maps, manufacturers of navigation systems, etc.

According to a second aspect of the present invention, the object may be achieved by an example system for ascertaining a piece of topological information of an intersection, including:
  a locating unit for locating a vehicle with lane accuracy when negotiating the intersection;
  an ascertainment unit for ascertaining data by the vehicle when negotiating the intersection;
  a transmission unit for transmitting the data to a processing unit, the processing unit being designed to ascertain a connectivity of the lanes of the intersection from the data.

Advantageous refinements of the example method are described herein.

One advantageous refinement of the example method in accordance with the present invention provides that locating the vehicle with lane accuracy is carried out using WGS85 coordinates. In this way, a proven method is utilized for the accurate localization in the form of GPS data.

One further advantageous refinement of the example method provides that locating the vehicle with lane accuracy is carried out using street names. This provides an alternative option for the localization with lane accuracy.

One further advantageous refinement of the example method provides that data of a defined high number of trips of the vehicles are used for ascertaining the connectivity. This supports a statistical high data quality.

One further advantageous refinement of the example method provides that lane change matrices are created from the data, which indicate from which lane-road combination the vehicle enters another lane-road combination, the lane change matrices being provided to a neural network as input data.

One further advantageous refinement of the example method provides that a defined filtering of unlikely connectivity data is carried out during the ascertainment of the connectivity. In this way, it is achieved that non-available connectivity data are largely avoided.

Further advantageous refinements of the example method provide that the transmission of the data to the processing unit is carried out in real time or is not carried out in real time. This advantageously provides different options for transmitting the data.

One further advantageous specific embodiment of the method provides that the neural network provides the data regarding connectivity in the form of a number or in the form of an adjacency matrix. This advantageously provides different options for outputting the connectivity data.

The present invention is described in greater detail hereafter with further features and advantages based on several figures. All described or illustrated features, either alone or in any arbitrary combination, form the subject matter of the present invention, regardless of the wording or representation thereof in the description herein or in the figures.

Described method features result similarly from correspondingly described device features, and vice versa. This means in particular that features, technical advantages and statements regarding the example method result similarly from corresponding statements, features and advantages of the example system, and vice versa.

DETAILED DESCRIPTION OF EXAMPLE EMBODIMENTS

The present invention provides an automated method with the aid of which the connections of lanes on different roads with respect to one another may be ascertained from a set of simple observations of a fleet of vehicles. For a pair of roads A and B, the provided method thus ascertains from which lane on road A a vehicle is able to turn onto which set of lanes on road B.

The simple observations of the vehicle fleet include the following observations:
 A sequence of road segments traveled by the vehicle during its last trip
 For each road segment: In which lane did the vehicle believe it was situated?
 At what spots does a vehicle believe that it changed lanes and from which lane to which other lane was the change carried out?

The described observations may be made by any vehicle which is able to locate its accurate lane on a road map. It is possible for the observations of individual vehicles to be subject to errors. The method provided by the present invention is tolerant toward such observation errors.

The present invention provides that vehicles pass through intersections in an observation area and results of their self-localization with lane accuracy are preferably wirelessly transmitted to a central authority. The wireless transmission may be carried out with the aid of mobile radio communication, WLAN or with the aid of another wireless transmission technology.

Figure 1:
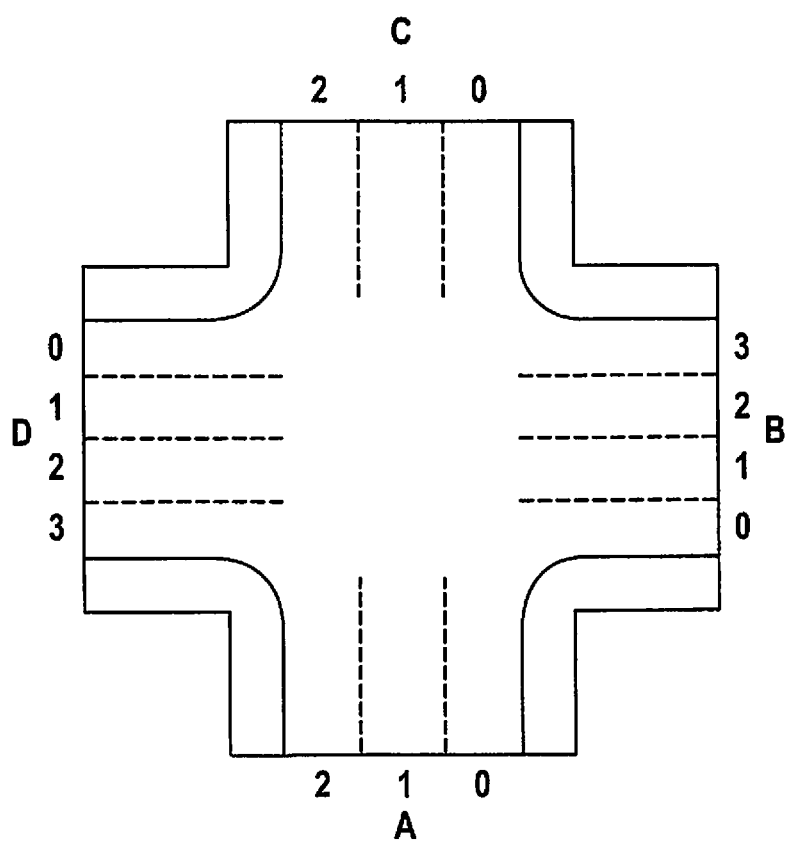
FIG. 1 shows a schematic representation of an intersection including multiple roadways and traffic lanes.

From a defined set of these observations, this central authority now infers how the traffic lanes of different roads are connected to one another ("connectivity"). For an intersection including four roads, these may look as is shown in FIG. 1, for example:
 An intersection including a total of four roadways A, B, C and D is apparent, roadways A and C each including three traffic lanes 0 . . . 2, and roadways B and D each including four traffic lanes 0 . . . 3. With the aid of the provided method, it is ascertained from which lane of one of roadways A through D it is possible to turn into which lane of another roadway.

Known methods used in practice for generating lane-accurate road maps are associated with complex manual work. Moreover, the vehicles used in the process utilize special and, in some instances, very cost-intensive hardware for recording infrastructural circumstances.

In contrast, the method provided by the present invention requires only one option of self-localization with lane accuracy. By these vehicles being able to permanently report observation data, the lane-accurate road map may be updated at a considerably higher rate.

Each vehicle of a fleet records the segment traveled by this vehicle. For this purpose, it is recorded for the sequence of roads being passed through (whose existence is preferably known from an onboard map) in which lane the vehicle was situated (host lane estimation) and where (geographically, for example with the aid of GPS position based on WGS85 coordinates, street names, etc.) the vehicle carried out a lane change. Since the host lane estimation may possibly be subject to errors, the segment recorded by a vehicle is referred to hereafter as "lane-accurate route R subject to errors."

When:

$$R \in (P \times S \times G)$$

with
P . . . set of all negotiable road segments
S . . . set of all possible lanes of a road
G . . . set of all geographical positions on earth then $$r=((p_0,s_0,g_0),(p_0,s_1,g_1),(p_1,s_2,g_2),(p_1,s_3,g_3)) \text{ with}$$
$$p_0,p_1 \in P$$

$$s_0,s_1,s_2,s_3 \in S$$

$$g_0,g_1,g_2 \in G$$

describes a possible lane-accurate route subject to errors, which indicates that a vehicle at $g_0$ on road $p_0$ used lane $s_0$, and at $g_1$ on $p_0$ changed from lane so to lane $s_1$. Thereafter, at $g_2$ a change was carried out from road $p_0$ lane $s_1$ to road $p_1$ lane $s_2$, and at $g_3$ on $p_1$ from lane $s_2$ to lane $s_3$, where applies:
$p_i$ . . . a specific characteristic of a road
$s_i$ . . . a specific characteristic of a traffic lane
$g_i$ . . . a specific characteristic of a geographical position.

Lane-accurate routes subject to errors from a set of vehicles are now collected in a processing unit 40 in the form of a central authority or a back-end system. This back-end system is in possession of an electronic road map K which, however, does not necessarily include pieces of information about the connectivity of lanes of the roadways to one another.

With the provided method, it is possible to generate these pieces of information regarding the connectivity.

Figure 2:
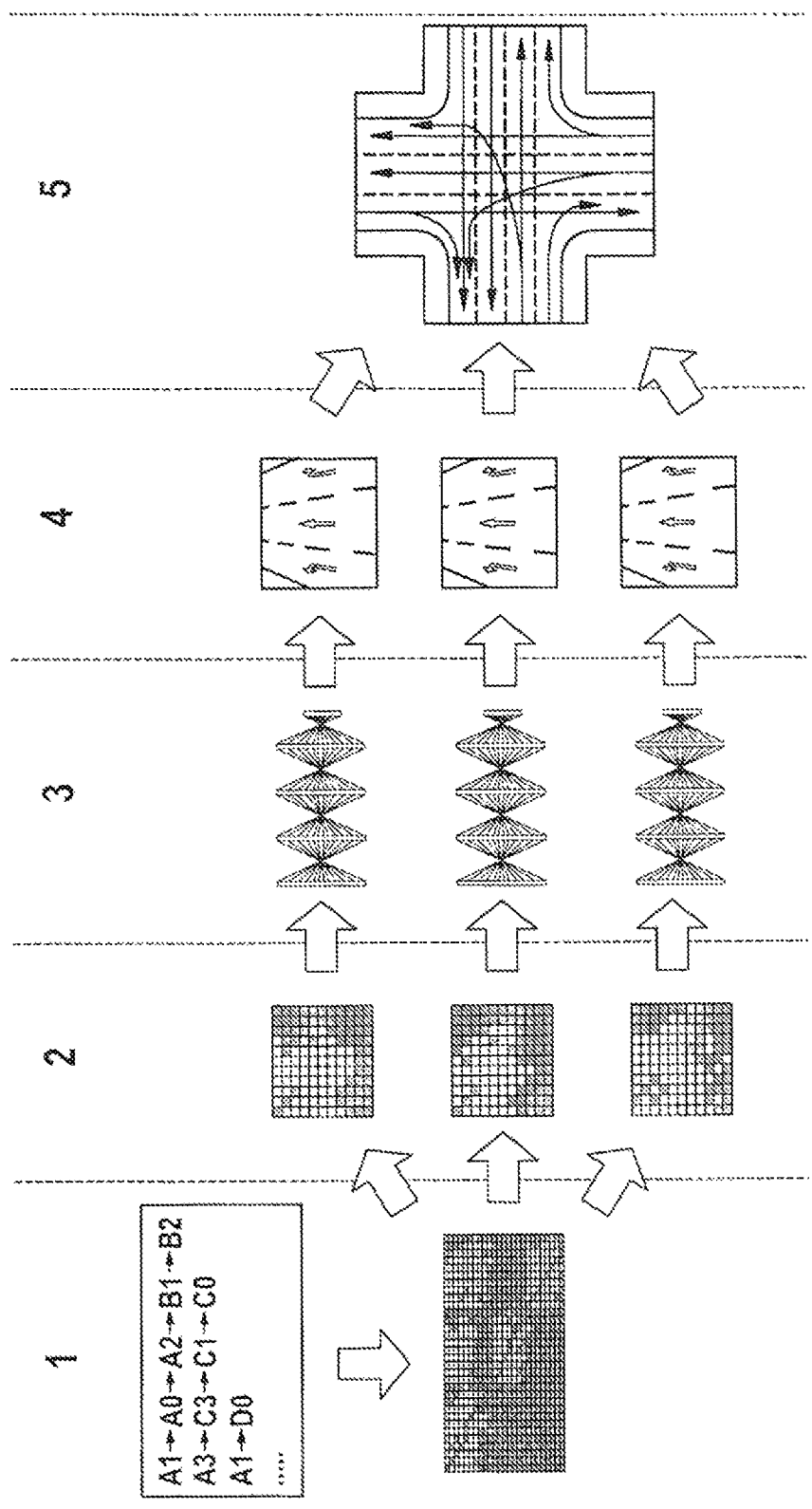
FIG. 2 shows a schematic representation of an operating mode of a provided method for ascertaining pieces of topological information of an intersection.

A schematic representation of the method is shown in FIG. 2. It is checked for each geographical point g∈G at which two or more roads $p_0, p_1, \ldots, p_n \in P$ meet ("intersection") in the digital map K whether sufficient (e.g., 1000 or more) routes that may potentially be subject to errors are available on the processing unit for which vehicles traveled from $p_0$ onto one of the roads $p_1 \ldots p_n$.

If this is the case, a matrix ("lane change matrix")

$$M^{(i,j)} \in N^{m \times m}$$

is created for each of the road pairs $(s_i, s_j)$ associated with the intersection, 0≤i, j, ≤n and i≠j, in which the entry $M_{k,l}^{(i,j)}$ indicates how many vehicles in the observations changed from lane k on road $s_i$ to lane I on road s
 $N^{m \times m}$ . . . set of all matrices having m rows and m columns which exclusively contain natural numbers This matrix is now used as input for a previously trained neural network, which from this matrix ascertains the connectivity of the roads $s_i$ and $s_j$ with respect to one another and thereafter outputs them. If this is carried out for all road pairs of the intersection, the lane-accurate connectivity of the entire intersection may thus be determined by aggregating this piece of information for all roadways of the intersection.

The neural network used is preferably a feedforward neural network including preferably multiple hidden layers, the input of the neural network being the matrix $M^{(i,j)} \in N^{m \times m}$. This is supplied to the neural network as vector $V \in R^{m,m}$, where applies:

$$V_{mk+1} = M_{k,l}^{(i,j)}$$

where applies:

$R^{m,m}$ ... set of all vectors having the length m·m (=$m^2$) which are exclusively made up of real numbers $M_{k,l}^{(i,j)}$ entry in row k and column I of matrix $M^{(i,j)}$ $M^{(i,j)}$ ... lane change matrix which describes the number of lane changes carried out between road pair $p_i$ and $p_j$ $0 \leq k \leq m$ $0 \leq 1 \leq m$ $m \in N$ N ... set of all natural numbers (including 0)

V may also be normalized into the value range [0,1]. The neural network thus has $m^2$ input nodes and o output nodes, o representing the number of useful options with the aid of which lanes of two roadways of the intersection may be connected to one another. The neural network thus maps the input matrix $M^{(i,j)}$ on one of the options, in which way two roadways $p_i$, $p_j$ may be connected to one another. These options are completely and unambiguously enumerated even before the training phase of the neural network and are each assigned to exactly one output node.

For example, for roadways including up to m lanes, it applies:

Option 1: $p_i$ lane 0 to $p_j$ lane 0
Option 2: $p_i$ lane 0 to $p_j$ lane 1
Option m: $p_i$ lane 0 to $p_j$ lane m
Option m+1: $p_i$ lane 1 to $p_j$ lane 0
Option $m^2$: pi lane m to $p_j$ lane m
Option $m^2$+1: $p_i$ lane 0 to $p_j$ lane 0, and $p_i$ lane 1 to $p_j$ lane 1
Option $m^2$+(m−1)$^2$: $p_i$ lane m−1 to $p_j$ lane m−1, and $p_i$ lane m to $p_j$ lane m
Option: $\Sigma_{i=0}^{m=1}$ (m−i)$^2$; $p_i$ lane k to $p_j$ lane k ... for $0 \leq k \leq m$ For m=10, this would be o=385 options. In this way, a piece of output information of the neural network is represented by a number which indicates a connectivity between a lane-road combination and another lane-road combination of the intersection.

As an alternative, where the neural network maps input matrix $M^{(i,j)}$ on one option as to how two roadways $p_i$, $p_j$ may be connected to one another, the output of the neural network may also be made up of o=$m^2$ nodes, which may be interpreted as adjacency matrix of the lanes. For this purpose, the (mk+1)th output node of the neural network indicates that a connection exists between lane k of road i and lane I of road j, where applies:

$0 \leq k, l \leq m$.

It will be apparent to those skilled in the art that a plurality of neural networks may be used to carry out the described method, which may be trained in a variety of ways.

The training of the neural network may take place in a variety of ways. For example, the following parameters mentioned by way of example yielded good results; however, it shall be understood that good results may also be achieved using other parameters not mentioned here:

Optimization algorithm: stochastic gradient decent with an iteration
Target function: mean square logarithmic error
Update: Nesterov momentum 0.98
Initial weights with the aid of Xavier
Learning rate of 0.1
Division of the inputs into o different classes (maximum of m lanes per road, each class represents one possible "turning topology" between two roads)
100 data sets per class, one data set being made up of approximately 300 passages
Mini batches of 250 data sets pulled randomly from the o·100 training data sets
softsign function $$f(x) = \frac{x}{1 + |x|}$$

having been used as the activation function, but other functions also being conceivable.

FIG. 2 shows a schematic operating mode of the described method. A three-tier configuration is apparent, which indicates that three exit roads or roadways are conceivable from one entrance road or roadway, as it is implemented by an intersection including four roadways.

In a column 1, data of a lane-road combination with another lane-road combination traveled in the process are ascertained in a process of locating the vehicles with lane accuracy and thereby form the assigned lane change matrix. The three rows of column 2 represent sections of the lane change matrix of column 1, which represent three options as to from which lane on roadway A it is possible to turn onto associated lanes of roadways B, C, D.

In column 3, the lane change matrices are each supplied to a neural network. In a column 4, a connectivity between the lane-roadway combinations of the intersection is ascertained with the aid of the neural network.

Column 5 represents the pieces of output information of the neural network, which thus indicate the connectivity of the entire intersection, as is indicated by arrows within the intersection.

Figure 3:
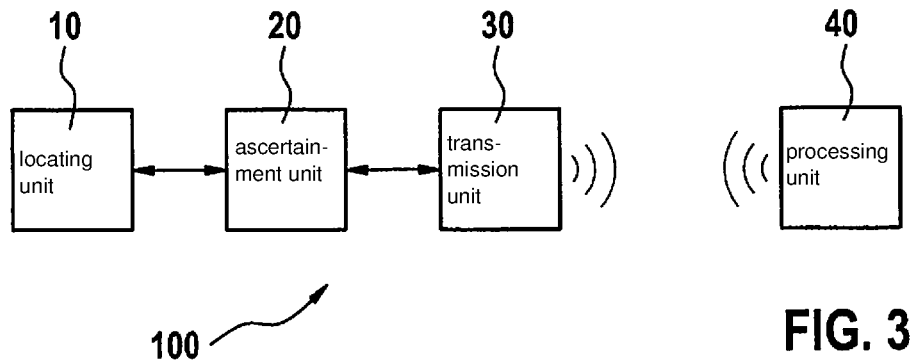
FIG. 3 shows a block diagram of one specific embodiment of a system for ascertaining a piece of topological information of an intersection.

FIG. 3 shows a block diagram of one specific embodiment of a described system 100 for ascertaining a topology of an intersection.

A locating unit 10 for locating a vehicle with lane accuracy (not shown) when negotiating the intersection is apparent. Locating unit 10 is functionally connected to an ascertainment unit 20, which is provided to ascertain data by the vehicle when negotiating the intersection. A transmission unit 30 for wirelessly transmitting the data to a processing unit 40 is provided functionally with ascertainment unit 20. As an alternative, it may also be provided to transmit the data to processing unit 40 by wire. It may be provided to transmit the described data in real time, or alternatively not in real time, to processing unit 40. Processing unit 40 is designed to ascertain a connectivity of the lanes of the intersection from the supplied data.

Figure 4:
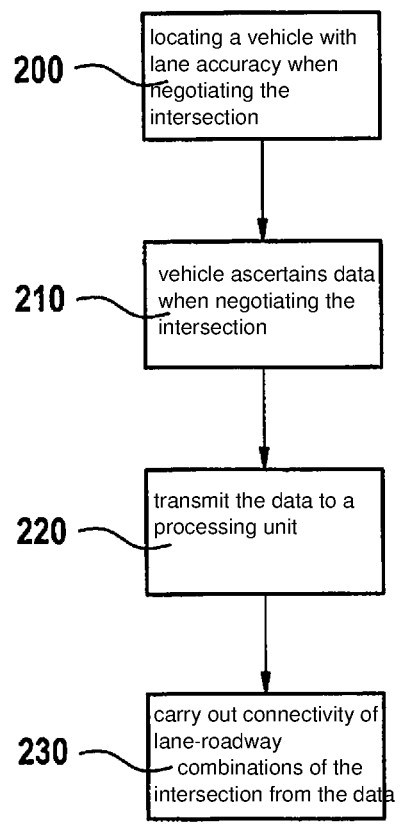
FIG. 4 shows a schematic sequence of one specific embodiment of the provided method for ascertaining a piece of topological information of an intersection.

FIG. 4 shows a schematic sequence of a method for ascertaining a topology of an intersection.

In a step 200, locating a vehicle with lane accuracy when negotiating the intersection is carried out.

In a step 210, data are ascertained by the vehicle when negotiating the intersection.

In a step 220, the data are transmitted to a processing unit 40.

In a step 230, a connectivity of lane-roadway combinations of the intersection from the data is carried out with the aid of processing unit 40.

As a result, a safety level in traffic may advantageously be enhanced with the aid of the described method, and a homogeneous flow of traffic may be provided.

Advantageously, the method according to the present invention may be implemented as software which runs on system 100, for example. This supports an easy adaptability of the method.

Those skilled in the art will suitably modify the features of the present invention and/or combine them with one another, without departing from the core of the present invention.

What is claimed is:

1. A method for ascertaining a piece of topological information of an intersection, the method comprising:
   locating a vehicle with lane accuracy when negotiating the intersection;
   ascertaining data by the vehicle when negotiating the intersection;
   transmitting the data to a processing unit; and
   ascertaining a connectivity of lane-roadway combinations of the intersection from the data with the processing unit;
   wherein lane change matrices are created from the data, which indicate from which lane-road combination the vehicle enters another lane-road combination, the lane change matrices being provided to a neural network as input data.

2. The method as recited in claim 1, wherein locating the vehicle with lane accuracy is carried out using WGS85 coordinates.

3. The method as recited in claim 1, wherein locating the vehicle with lane accuracy is carried out using street names.

4. The method as recited in claim 1, wherein data of a defined high number of trips of the vehicles are used for ascertaining the connectivity.

5. The method as recited in claim 1, wherein a defined filtering of unlikely connectivity data is carried out during the ascertainment of the connectivity.

6. The method as recited in claim 1, wherein the transmission of the data to the processing unit is carried out in real time.

7. The method as recited in claim 1, wherein a neural network provides the data regarding connectivity in the form of a number or in the form of an adjacency matrix.

8. A system for ascertaining a piece of topological information of an intersection, comprising:
   a locating unit configured to locate a vehicle with lane accuracy when negotiating the intersection;
   an ascertainment unit configured to ascertain data by the vehicle when negotiating the intersection;
   a transmission unit configured to transmit the data to a processing unit, the processing unit being configured to ascertain a connectivity of the lanes of the intersection from the data;
   wherein lane change matrices are created from the data, which indicate from which lane-road combination the vehicle enters another lane-road combination, the lane change matrices being provided to a neural network as input data.

9. A non-transitory computer-readable data carrier on which is stored a computer program, which is executable by a processor, comprising:
   a program code arrangement having including program code for ascertaining a piece of topological information of an intersection, by performing the following:
      locating a vehicle with lane accuracy when negotiating the intersection;
      ascertaining data by the vehicle when negotiating the intersection;
      transmitting the data to a processing unit; and
      ascertaining a connectivity of lane-roadway combinations of the intersection from the data with the processing unit;
      wherein lane change matrices are created from the data, which indicate from which lane-road combination the vehicle enters another lane-road combination, the lane change matrices being provided to a neural network as input data.

* * * * *